United States Patent
Ito et al.

(10) Patent No.: US 10,193,355 B2
(45) Date of Patent: Jan. 29, 2019

(54) ELECTRIC POWER SUPPLY SYSTEM

(71) Applicant: HONDA MOTOR CO., LTD., Tokyo (JP)

(72) Inventors: Yoshihiro Ito, Wako (JP); Akira Yanagimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 24 days.

(21) Appl. No.: 15/452,738

(22) Filed: Mar. 8, 2017

(65) Prior Publication Data

US 2017/0264108 A1    Sep. 14, 2017

(30) Foreign Application Priority Data

Mar. 8, 2016   (JP) .................................. 2016-044283

(51) Int. Cl.
     *H02J 7/00* (2006.01)

(52) U.S. Cl.
     CPC .......... *H02J 7/0013* (2013.01); *H02J 7/0021* (2013.01); *H02J 7/0054* (2013.01); *H02J 7/0073* (2013.01); *Y02T 10/7005* (2013.01)

(58) Field of Classification Search
     CPC .... H02J 7/0013; H02J 7/0073; B60L 11/1861
     USPC ................. 320/104, 112, 132, 134; 307/10.1
     See application file for complete search history.

(56) References Cited

U.S. PATENT DOCUMENTS

2011/0278920 A1 * 11/2011 Sakamoto ................. B60L 1/00
                                                        307/10.1
2017/0129359 A1 *  5/2017 Dunlap ............... B60L 11/1861

FOREIGN PATENT DOCUMENTS

JP        2013-059161        3/2013

* cited by examiner

*Primary Examiner* — Edward Tso
*Assistant Examiner* — Aaron Piggush
(74) *Attorney, Agent, or Firm* — Mori & Ward, LLP

(57) ABSTRACT

An electric power supply system includes a first power storage, a second power, an input, and a processor. Information including priority information is to be input through the input. The processor is configured to determine whether the first power storage is charged up to a first target residual capacity and the second power storage is charged up to a second target residual capacity by a timing at which at least one of the first power storage and the second power storage starts discharging. The processor is configured to charge either one of or both of the first power storage and the second power storage according to the priority information when it is determined that the first power storage is not charged up to the first target residual capacity and/or the second power storage is not charged up to the second target residual capacity by the timing.

19 Claims, 10 Drawing Sheets

DISTANCE PRECEDENCE CHARGE CONTROL

ELECTRIC POWER SUPPLY SYSTEM

CROSS-REFERENCE TO RELATED APPLICATIONS

The present application claims priority under 35 U.S.C. § 119 to Japanese Patent Application No. 2016-044283, filed Mar. 8, 2016. The contents of this application are incorporated herein by reference in their entirety.

BACKGROUND OF THE INVENTION

Field of the Invention

The present invention relates to an electric power supply system.

Discussion of the Background

In a Japanese Patent Application Laid-Open Publication No. 2013-059161, the problem to be solved is to provide an electric motorcar which has a high output density battery and a high energy density battery and which is capable of delaying the deterioration of the high energy density battery even in such a condition where the high energy density battery does not have many opportunities to be used for travelling (abstract, [0006]).

In order to solve the problem the electric motor vehicle 100 of the Japanese Patent Application Laid-Open Publication No. 2013-059161 (abstract) is provided with a first battery (high output density battery) 12 which can be charged from an external power source, and a second battery (high energy density battery) 22, and a controller 8 for controlling a charge of electricity to the batteries 12, 22. The controller 8 executes a power transfer step, a first battery charging step and a second battery charging step. In the power transfer step, the first battery 12 is charged by using the second battery 22 prior to the power charge by using the external power source. In the first battery charging step, the first battery 12 is charged by using the external power source. In the second battery charging step, the second battery 22 is charged by using the external power source. The deterioration of the second battery 22 is delayed by lowering SOC of the second battery 22 during charging process.

SUMMARY OF THE INVENTION

According to a first aspect of the present invention, an electric power supply system includes a first power storage, a second power storage, charge control device, and a user input device. The first power storage device is high capacity type. The second power storage device is high output type. The charge control device controls power charge to the first power storage device and the second power storage device. The user input device enters a command of the user. The power charge control device is configured to determine whether or not the first power storage device and the second power storage device can be charged up to a target residual capacity until a scheduled next use start time, and, when it is determined that the first power storage device and the second power storage device cannot be charged up to the target residual capacity until the scheduled use start time, either one or both of the first power storage device and the second power storage device are charged according to precedence which is inputted through the user input device.

According to a second aspect of the present invention, an electric power supply system includes a first power storage, a second power storage, an input, and a processor. The first power storage has a first capacity and a first output. The second power storage has a second capacity smaller than the first capacity and a second output larger than the first output. Information including priority information is to be input through the input. The processor is configured to determine whether the first power storage is charged up to a first target residual capacity and the second power storage is charged up to a second target residual capacity by a timing at which at least one of the first power storage and the second power storage starts discharging. The processor is configured to charge either one of or both of the first power storage and the second power storage according to the priority information when it is determined that the first power storage is not charged up to the first target residual capacity and/or the second power storage is not charged up to the second target residual capacity by the timing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
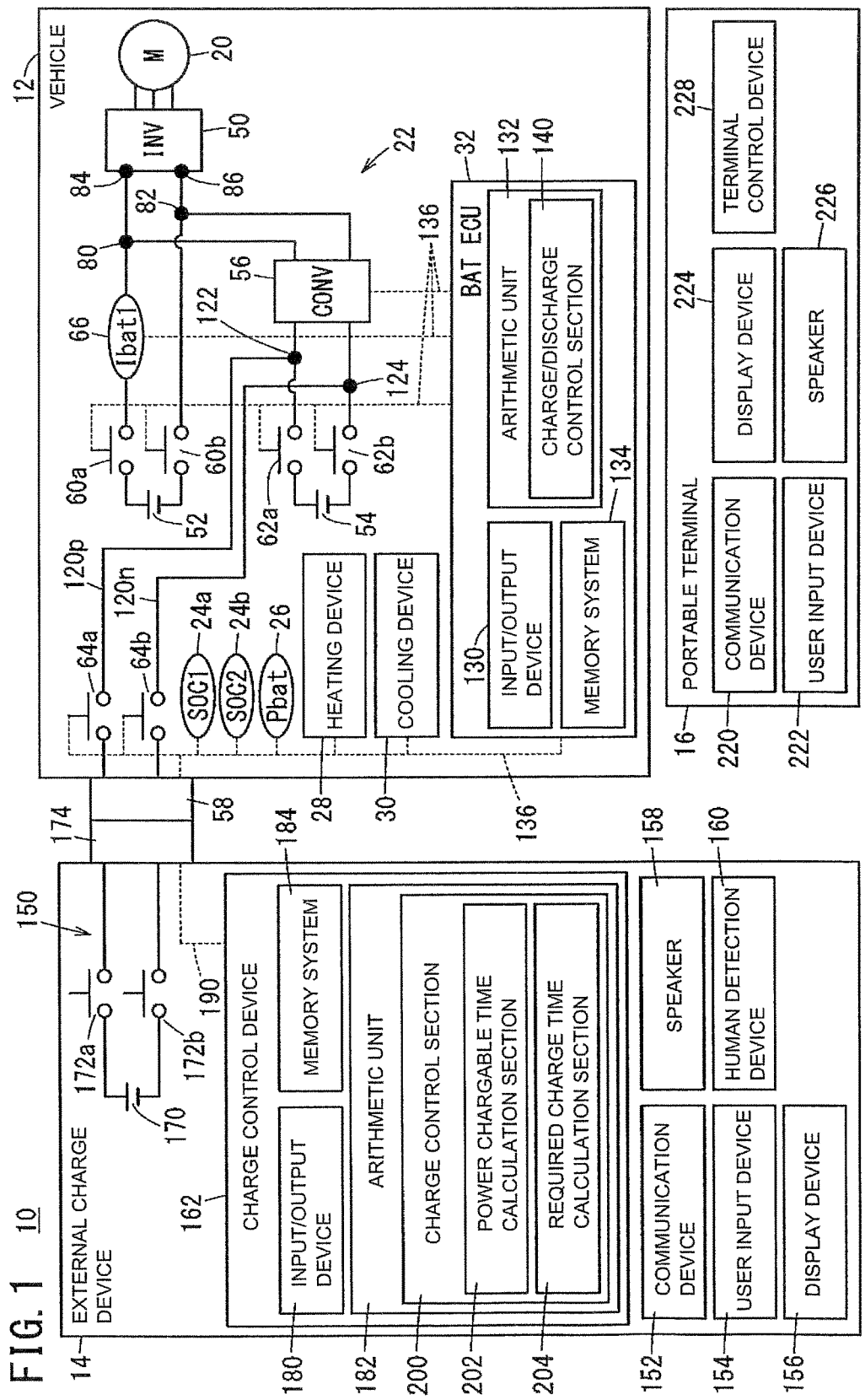
FIG. 1 is a schematic configuration diagram showing an electric power supply system in accordance with one embodiment of the present invention.

The embodiments will now be described with reference to the accompanying drawings, wherein like reference numerals designate corresponding or identical elements throughout the various drawings.

I. One Embodiment

<I-A: Configuration>

[I-A-1: Overall Configuration of the Electric Power Supply System 10]

FIG. 1 is a schematic configuration diagram showing an electric power supply system 10 in accordance with one embodiment of the present invention. The electric power supply system 10 includes an electric vehicle 12 (hereinafter, also referred to as "vehicle 12"), an external charge device 14 and a portable terminal 16. In this embodiment, a high capacity battery 52 and a high output battery 54 of the vehicle 12 can be charged by the external charge device 14 by setting charge precedence (hereinafter, also referred to as "precedence"). Moreover, charge conditions can be confirmed by the portable terminal 16. Hereinafter, the high capacity battery 52 is also referred to a first battery 52, a battery 52 or a high capacity BAT, and the high output battery 54 is also referred to as a second battery 54, a battery 54 or a high output BAT.

[I-A-2: Electric Vehicle 12]

(I-A-2-1: Overall Configuration of the Electric Vehicle 12)

As shown in FIG. 1, the vehicle 12 includes a motor 20 for travelling, a vehicle electric power system 22, SOC sensors 24a, 24b, a temperature sensor 26, a heating device 28, a cooling device 30, and a battery electronic control unit 32 (hereinafter, referred to as "battery ECU 32", "BAT ECU 32" or "ECU 32"). The vehicle 12 travels by driving force which is generated by the motor 20 by using electric power supplied from the vehicle electric power system 22.

When charging the high capacity battery 52 and the high output battery 54 of the vehicle electric power system 22 from the external charge device 14, the ECU 32 controls the vehicle electric power system 22 by selectively using the SOC sensors 24a, 24b, the temperature sensor 26, the heating device 28 and the cooling device 30, while communicating with the external charge device 14.

(I-A-2-2: Motor 20)

The motor 20 is a three-phase alternating current brushless type and generates the driving force based on electric power supplied from the vehicle electric power system 22, so that wheels (not shown) are rotated by the driving force through a transmission (not shown). Moreover, the motor 20 is configured to output the electric power (regeneration power Preg) [W] generated by regeneration, to the vehicle electric power system 22. The regeneration power Preg may be outputted to accessories which are not shown in the drawing. Herein, the control of the motor 20 is performed by a motor electronic control unit (motor ECU) and the like which are not shown in the drawing.

(I-A-2-3: Vehicle Electric Power System 22)

(I-A-2-3-1: Overall Configuration of the Vehicle Electric Power System 22)

The vehicle electric power system 22 is configured to supply the motor 20 with the electric power, and the regeneration power Preg from the motor 20 is supplied to the vehicle electric power system. As shown in FIG. 1, the vehicle electric power system 22 includes an inverter 50, a DC/DC converter 56, a vehicle side connector 58, contactors 60a, 60b, 62a, 62b, 64a, 64b, and a current sensor 66 in addition to the high capacity battery 52 and the high output battery 54.

(I-A-2-3-2: Inverter 50)

The inverter 50 has a three-phase full bridge type configuration and executes a DC-AC conversion. To put it more concretely, the inverter 50 converts a direct current into a three-phase alternating current thereby to supply it to the motor 20 and supplies a direct current after an AC-DC conversion associated with regeneration operation, to at least one of the batteries 52, 54.

(I-A-2-3-3: High Capacity Battery 52 and High Output Battery 54)

Each of the batteries 52, 54 includes a plurality of battery cells and is a power storage device (energy storage) which can output high voltage. A lithium ion secondary battery, a nickel hydrogen secondary battery and the like can be utilized as these batteries, for example. In this embodiment, the lithium ion secondary battery is utilized for each of the batteries 52, 54. As a substitute for either one or both of the batteries 52, 54, it is possible to utilize a power storage device such as a capacitor and the like.

Cathode sides of the batteries 52, 54 are connected at a connecting point 80, and anode sides of the batteries 52, 54 are connected at a connecting point 82. The connecting point 80 on the cathode side is connected to a connecting point 84 of the inverter 50, and the connecting point 82 on the anode side is connected to a connecting point 86 of the inverter 50. Accordingly, a power source route including the first battery 52 and a power source route including the second battery 54 are connected in parallel with the inverter 50 and the motor 20.

The first battery 52 has a higher capacity in comparison with the second battery 54. On the other hand, the second battery 54 has a higher output in comparison with the first battery 52. In other words, the first battery 52 is a high capacity type power storage device, while the second battery 54 is a high output type power storage device. When making a comparison between the batteries 52 and 54, there are differences as shown in the following Table 1.

TABLE 1

| Characteristics | High capacity battery | High output battery |
| --- | --- | --- |
| Weight capacity density [W/kg] | Large | Small |
| Weight output density [Wh/kg] | Small | Large |
| Impedance (Internal resistance) | Large | Small |
| C rate dependence | Large | Small |
| Suitable charge and discharge | A fixed low power is continuously charged and discharged. | A large power is instantaneously charged and discharged. |

In Table 1, the weight capacity density indicates a charge and discharge capacity per unit weight. The weight output density indicates a charge and discharge output per unit weight. The C rate indicates a charge and discharge rate characteristic.

(I-A-2-3-4: DC/DC Converter 56)

Figure 2:
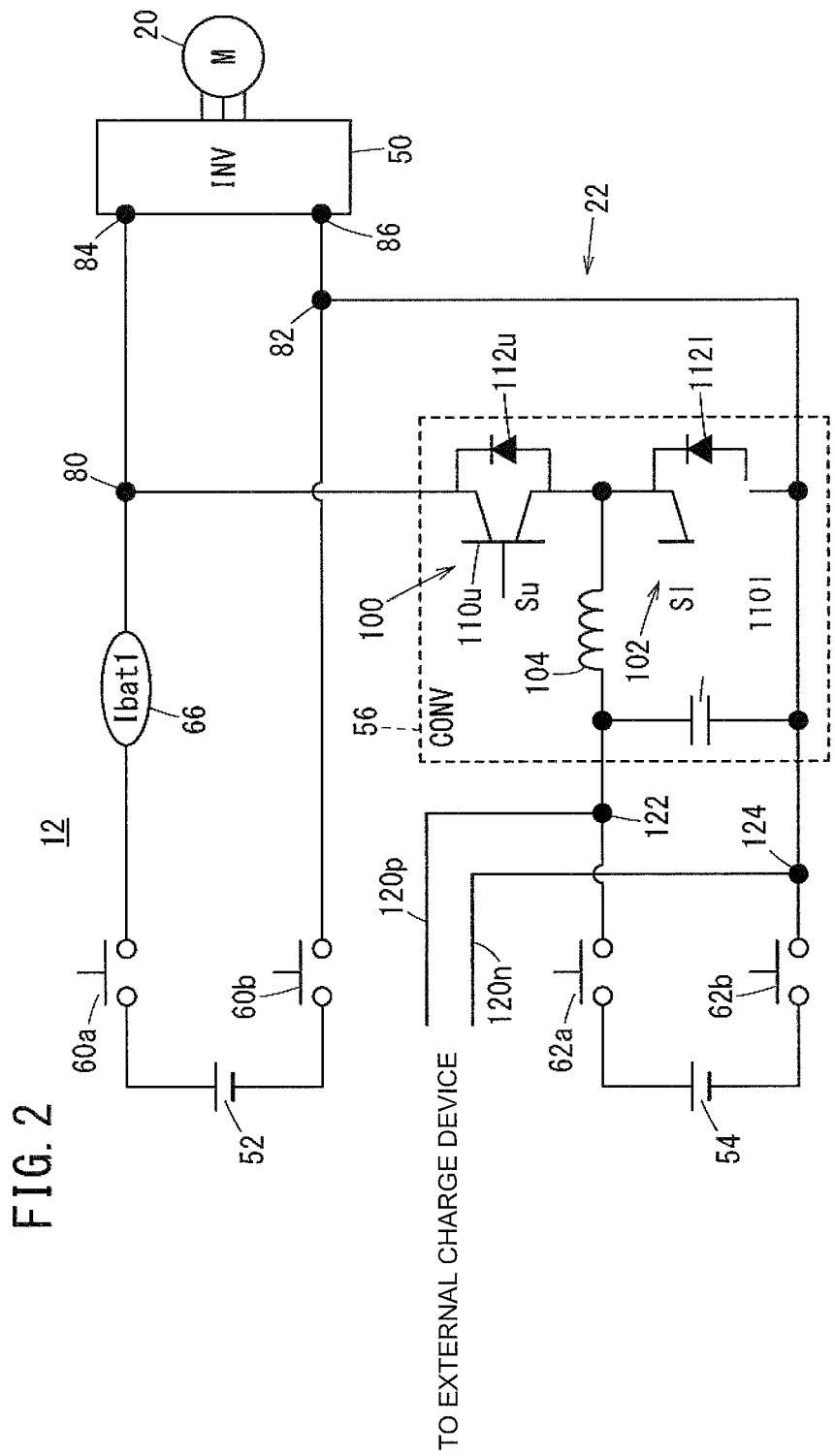
FIG. 2 is a circuit diagram of a vehicle electric power system of the embodiment.

FIG. 2 is a circuit diagram of the vehicle electric power system 22 of the embodiment. The DC/DC converter 56 (hereinafter, also referred to as "converter 56") transforms (herein, steps up) an output voltage Vbat2 of the high output battery 54 or a supply voltage Vc from the external charge device 14 and outputs it to the inverter 50 or the high capacity battery 52. In addition, the converter 56 transforms (herein, steps down) a regeneration voltage Vreg from the motor 20 or an output voltage Vbat1 from the high capacity battery 52 and supplies it to the high output battery 54. Or alternatively, it may be configured to perform only the transformation of the output voltage Vbat2 or the supply voltage Vc.

As shown in FIG. 2, the converter 56 has an upper arm 100, a lower arm 102, a reactor 104 and a capacitor 106. The upper arm 100 includes a switching element 110u, and a diode 112u which is arranged in an inversely parallel relationship with the switching element. The lower arm 102 includes a switching element 110l, and a diode 112l which is arranged in an inversely parallel relationship with the switching element. As the switching elements 110u, 110l, a power switching element such as MOSFET (including SiC (silicon carbide) type MOSFET) or IGBT, etc. is employed.

The switching element 110u is switched by a drive signal Su supplied from the ECU 32, while the switching element 1101 is switched by a drive signal Sl supplied from the ECU 32. The drive signals Su, Sl are PWM (plus width modulation) signals.

The capacitor 106 is arranged between the high output battery 54 and the converter 56 and configured to temporarily store the electric power so as to suppress voltage fluctuation between the battery 54 and the converter 56.

(I-A-2-3-5: Vehicle Side Connector 58)

The vehicle side connector 58 (hereinafter, also referred to as "connector 58") (FIG. 1) is used for a connection with a charge device side connector 174 of the external charge device 14. The connector 58 is connected to wiring 120p, 120n branched from branch points 122, 124 between the high output battery 54 and the converter 56.

(I-A-2-3-6: Contactors 60a, 60b, 62a, 62b, 64a, 64b)

The contactors 60a, 60b are arranged between the high capacity battery 52 and each of the connecting points 80, 82 and configured to switch the connection and disconnection between the high capacity battery 52, the inverter 50 and the converter 56. The contactor 62a, 62b are arranged between the high output battery 54 and the converter 56 and configured to switch the connection and disconnection between the high output battery 54 and the converter 56. The contactors 64a, 64b are arranged between the vehicle side connector 58 and each of the branch points 122, 124 and configured to switch the connection and disconnection between the vehicle electric power system 22 and the external charge device 14.

(I-A-2-3-7: Current Sensor 66)

The current sensor 66 is arranged between the high capacity battery 52 and the connecting point 80 and configured to detect an output current from the high capacity battery 52 or an input current into the high capacity battery 52 (hereinafter, also referred to as "input and output current Ibat1") thereby to output it to the ECU 32.

(I-A-2-4: SOC Sensors 24a, 24b)

The SOC sensor 24a (hereinafter, also referred to as "first SOC sensor 24a") is configured to detect a residual capacity (hereinafter, also referred to as "SOC1") [%] of the high capacity battery 52 thereby to output it to the ECU 32. The SOC sensor 24b (hereinafter, also referred to as "second SOC sensor 24b") is configured to detect a residual capacity (hereinafter, also referred to as "SOC2") [%] of the high output battery 54 thereby to output it to the ECU 32.

(I-A-2-5: Temperature Sensor 26)

The temperature sensor 26 is configured to detect a temperature Pbat (hereinafter, also referred to as "battery temperature Pbat") [° C.] of the high output battery 54 thereby output it to the ECU 32. Another temperature sensor which detects the temperature of the high capacity battery 52 may be provided in addition to the temperature sensor 26.

(I-A-2-6: Heating Device 28)

The heating device 28 is configured to heat the high output battery 54 and composed of a heating wire heater or an air conditioner, for example.

(I-A-2-7: Cooling Device 30)

The cooling device 30 is configured to cool the high output battery 54 and composed of an air conditioner, for example.

(I-A-2-8: Battery ECU 32)

The battery ECU 32 is configured to control the power charge and discharge of the batteries 52, 54 and has an input and output device 130, an arithmetic unit 132, a memory system 134 and the like. The input and output device 130 executes an input and output of a signal through a signal conductor (line) 136 in relation to each section of the vehicle 12 and the external charge device 14. The input and output device 130 includes an A/D conversion circuit (not shown) which converts an inputted analog signal into a digital signal.

The arithmetic unit 132 executes a program stored in the memory system 134 thereby to control the power charge and discharge of the batteries 52, 54 and is composed of a central processing unit (CPU), for example. The arithmetic unit 132 has a charge and discharge control section 140 for controlling the power charge and discharge of the batteries 52, 54.

The memory system 134 stores the program and data to be used by the arithmetic unit 132. Moreover, the memory system 134 stores the information INbat (hereinafter, also referred to "battery information INbat") with respect to the power charge and discharge characteristics of the batteries 52, 54. The battery information INbat includes the residual capacity of the full charge of the batteries 52, 54, a rated current and the like, for example.

The memory system 134 has a nonvolatile data storing part (random access memory (RAM), etc.) and a volatile data storing part (read only memory (ROM), etc.), for example.

[I-A-3: External Charge Device 14]

The external charge device 14 supplies the electric power to the batteries 52, 54 of the vehicle 12 so as to charge the batteries 52, 54. As shown in FIG. 1, the external charge device 14 includes a charge power system 150, a communication device 152, a user input device 154, a display device 156, a speaker 158, a human detection device 160 and a charge control device 162.

The charge power system 150 is configured to supply the electric power to the vehicle 12 and has a power source 170, contactors 172a, 172b, and the charge device side connector 174.

The communication device 152 is a device for communicating with the vehicle 12 and the portable terminal 16. In this embodiment, the communication between the vehicle 12 and the external charge device 14 is performed by wire communication (see FIG. 1). However, it may be performed by radio communication. Although the communication between the external charge device 14 and the portable terminal 16 is performed through the Internet which is not shown in the drawing, it may be performed by the direct radio communication.

The user input device 154 is used at the time the user who charges the vehicle 12 from the external charge device 14 inputs a predetermined command, and composed of an operation key or a touch panel, for example. The display device 156 may be formed as the touch panel in combination with the user input device 154.

The human detection device 160 detects the human located around the external charge device 14. The human detection device 160 includes, for example, an infrared ray sensor or an image sensor, and a human detection circuit which processes the detection signal thereby to determine presence or absence of the human.

The charge control device 162 is configured to control the whole external charge device 14 and includes an input and output device 180, an arithmetic unit 182 and a memory system 184. The input and output device 180 executes an input and output of the signal in relation to the vehicle 12 through the communication device 152 and a signal conductor (line) 190 and executes an input and output of the signal in relation to the portable terminal 16 through the communication device 152. The input and output device 180 includes an A/D conversion circuit (not shown) which converts an inputted analog signal into a digital signal.

The arithmetic unit 182 is configured to execute a program stored in the memory system 184 thereby to control the power supply from the external charge device 14 to the vehicle 12 (the charge of the batteries 52, 54) and composed of a central processing unit (CPU), for example. The arithmetic unit 182 has a charge control section 200 for controlling the charge of the batteries 52, 54.

The charge control section 200 includes an electric power chargeable time calculation section 202 (hereinafter, also referred to as "calculation section 202") and a required charge time calculation section 204 (hereinafter, also referred to as "calculation section 204"). The calculation section 202 is configured to calculate an electric power chargeable time $\Delta Tc$ [min] based on the current time Tcur and a scheduled start time Td (scheduled use start time). The calculation section 204 is configured to calculate a required charge time $\Delta Tn$ [min] based on SOC1, SOC2 of the batteries 52, 54. The details of the processing of the calculation sections 202, 204 will be referred to later with reference to FIG. 3, etc.

The memory system 184 stores the program and data to be used by the arithmetic unit 182. The memory system 184 has a nonvolatile data storing part (random access memory (RAM), etc.) and a volatile data storing part (read only memory (ROM), etc.), for example.

[I-A-4: Portable Terminal 16]

The portable terminal 16 is able to confirm the power charge condition. As shown in FIG. 1, the portable terminal 16 has a communication device 220, a user input device 222, a display device 224, a speaker 226 and a terminal control device 228.

The terminal control device 228 performs radio communication with the external charge device 14 through the communication device 220 and receives the power charge condition from the external charge device 14 thereby to have it displayed on the display device 224. Then, in addition to the display on the display device or instead of the display, a voice output may be performed from the speaker 226. Further, the terminal control device 228 may control the power charge from the external charge device 14 to the vehicle 12, through the communication with the external charge device 14. The terminal control device 228 includes an input and output device, an arithmetic unit and a memory system which are not shown in the drawing.

<I-B: Control>

[I-B-1: Outline of the Control]

In this embodiment, when charging the batteries 52, 54 of the vehicle 12 with the electric power from the external charge device 14, charge precedence setting control is executed such that a charge precedence of the batteries 52, 54 is set by the user. Then, based on the setting of the charge precedence by the user, power precedence charge control or distance precedence charge control is executed. The power precedence charge control is the control for preferentially charging the high output battery 54, while the distance precedence charge control is the control for preferentially charging the high capacity battery 52.

In this embodiment, the charge precedence has the same meaning as the order of charge. However, as referred to later, it is possible to weight the precedence while charging the batteries 52, 54 at the same time.

As will be explained in detail hereunder, the execution subject of the charge precedence setting control, the power precedence charge control and the distance precedence charge control in this embodiment is the charge control device 162 of the external charge device 14. However, a part or all of the control may be executed by another execution subject. For example, the battery ECU 32 of the vehicle 12 or the terminal control device 228 of the portable terminal 16 may be employed as such execution subject. Or alternatively, when a server (not shown) is provided, the server may be employed as the execution subject in a state where the server and the external charge device 14, etc. is capable of communicating with each other through the internet.

[I-B-2: Charge Precedence Setting Control]

Figure 3:
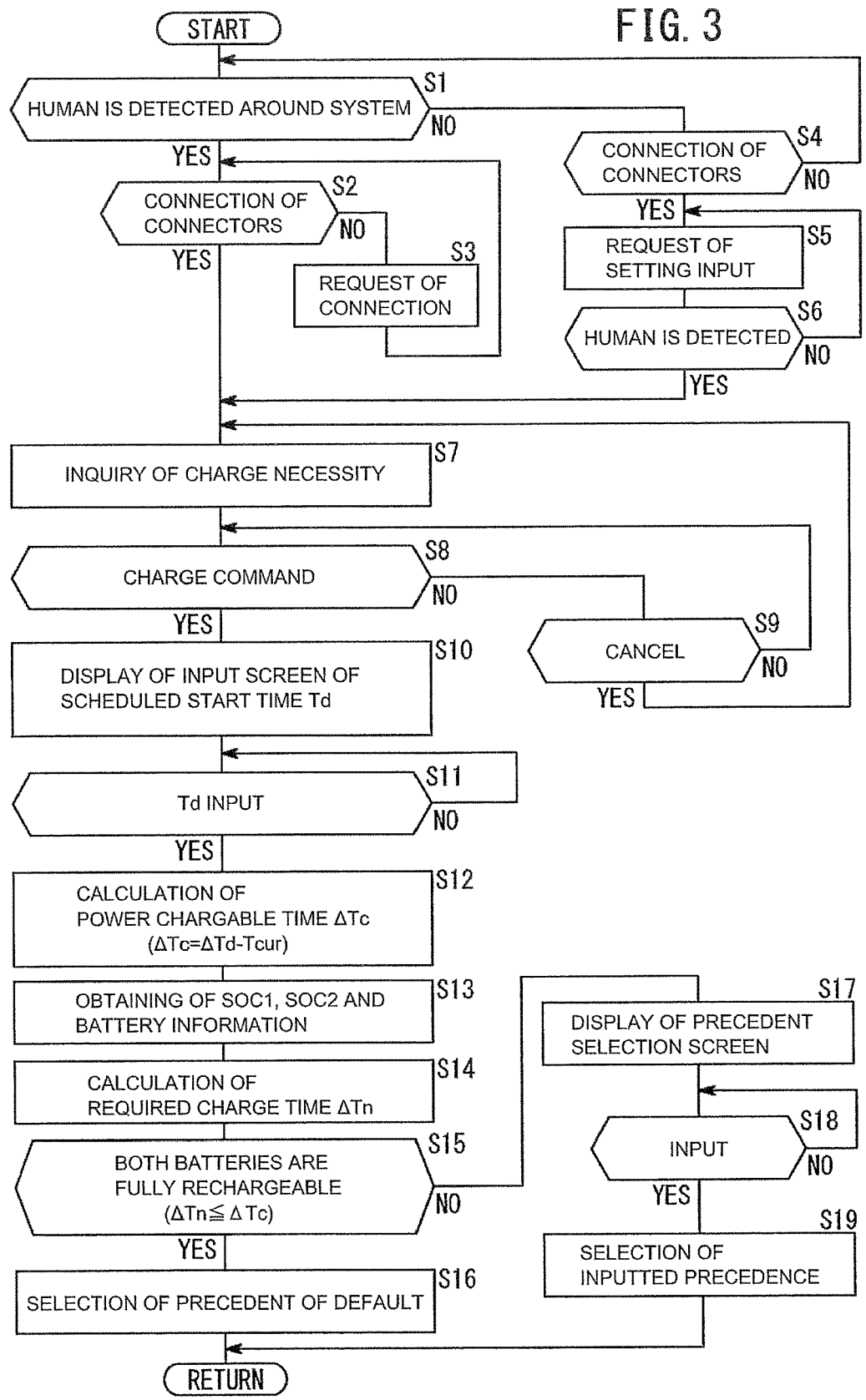
FIG. 3 is a flow chart of charge precedence setting control in accordance with the embodiment.

FIG. 3 is a flow chart of the charge precedence setting control in accordance with this embodiment. In step S1 of FIG. 3, the charge control device 162 determines whether or not the human (user) is detected around the system based on the output from the human detection device 160. When the human is detected (S1: YES), the charge control device 162 determines whether or not the vehicle side connector 58 is connected to the charge device side connector 174, in step S2. When the vehicle side connector 58 is connected to the charge device side connector 174 (S2: YES), the process is advanced to step S7.

When the vehicle side connector 58 is not connected to the charge device side connector 174 (S2: NO), the charge control device 162 allows a screen (connection request display) which requests the connection, to be displayed on the display device 156 and allows the voice (connection request voice) which requests the connection, to be outputted by the speaker 158, in step S3.

Herein, in the case where the predetermined screen is displayed on the display device 156 of the external charge device 14 in step S3 and the following steps, it is possible to display the predetermined display on the display device 224 of the portable terminal 16 in addition to the display device 156 or instead of the display device 156. Also with respect to the voice output, the speaker 226 of the portable terminal 16 may be employed in addition to the speaker 158 of the external charge device 14 or instead of the speaker 158.

When the vehicle side connector 58 is connected to the charge device side connector 174 based on the connection request display and the connection request voice (S2: YES), the process is advanced to step 7. Herein, the connection between the charge device side connector 174 and the vehicle side connector 58 may be configured such that the connection is requested so as to be completed before step S10 to be referred to later.

Returning to step 1, when the human (user) is not detected around the external charge device 14 (S1: NO), the charge control device 162 determines whether or not the vehicle side connector 58 is connected to the charge device side connector 174, in step S4. When the vehicle side connector 58 is connected to the charge device side connector 174 (S4: YES), the process is advanced to step S5.

In step S5, the charge control device 162 allows the speaker 158 to output the voice (setting input request voice) which requests the input of the setting, to the human (user) who seems to be present around the external charge device 14. Or alternatively, the charge control device 162 may allow the display device 156 to display the screen for making such request. In the following step S6, the charge control device 162 determines whether or not the human (user) is detected around the system based on the output from the human detection device 160. When the human is detected (S6: YES), the process is advanced to step S7.

In step S7, the charge control device 162 allows the display device 156 to display a message asking the necessity of the power charge and allows the speaker 158 to output the voice asking the necessity of the power charge. In step S8, the charge control device 162 determines whether or not the user enters the charge command through the user input device 154.

When the charge command is entered (S8: YES), the process is advanced to step S10. When the charge command is not entered (S8: NO), the charge control device 162, in step S9, determines whether or not the user enters a cancel command through the user input device 154. When the cancel command is inputted (S9: YES), the process returns to step S7. When the cancel command is not inputted (S9: NO), the process returns to S8.

In step S10, the charge control device 162 allows the screen (scheduled start time input screen) which requests the input of the scheduled start time Td (scheduled use start time), to be displayed on the display device 156. In addition, the charge control device 162 may allow the voice (scheduled start time request voice) which requests the input of the scheduled start time Td (scheduled use start time), to be outputted by the speaker 158. When the schedule start time Td is inputted through the user input device 154 (S11: YES), the process is advanced to step 12. When the scheduled start time Td is not inputted (S11: NO), step 11 is repeated. At that time, it may be configured to receive the cancel command in a similar way to step S9.

In step S12, the charge control device 162 calculates the power chargeable time ΔTc [min]. The power chargeable time ΔTc is defined as the time from the current time Tcur to the scheduled start time td.

In step S13, the charge control device 162 obtains the SOC (SOC1, SOC2) and the battery information INbat of each of the high capacity battery 52 and the high output battery 54 from the battery ECU 32. The battery information INbat is the information with respect to specifications of the first battery 52 and the second battery 54. When being premised on an assumption that the specifications of the high output battery 54 and the high capacity battery 52 are in conformity with the prescriptions, it is possible to dispense with the use of the battery information INbat.

In step S14, the charge control device 162 calculates the required charge time ΔTn based on SOC1, SOC2 and the battery information INbat. The required charge time ΔTn is the time required until each of the high output battery 54 and the high capacity battery 52 is fully charged.

In step S15, the charge control device 162 determines whether or not both of the batteries 52, 54 can be charged up to the fully charged state until the scheduled start time Td. This determination is made based on whether or not the required charge time ΔTn is shorter than and equal to the power chargeable time ΔTc. When the both of the batteries 52, 54 can be charged up to the fully charged state (S15: YES), the charge control device 162, in step S16, selects the charge precedence of the default.

With respect to the charge precedence of the default in this embodiment, the high capacity battery 52 is high and the high output battery 54 is low. To be put it more concretely, the high output battery 54 is first and the high capacity battery 52 follows in the order of the charge of the default in this embodiment. Or alternatively, it is possible to use such charge precedence (charging order) as disclosed in the patent reference 1.

When the both of the batteries 52, 54 cannot be charged up to the fully charged state (S15: NO), the charge control device 162, in step S17, allows the screen (charge precedent selection screen) for selecting the charge precedent, to be displayed on the display device 156. In this embodiment, as the alternatives of the charge precedent, there are such a first alternative that the high output battery 54 is first and the high capacity battery 52 follows and such a second alternative that the high capacity battery 52 is first and the high output battery 54 follows. Further, to facilitate the understanding of the user, the first alternative is guided as a power precedent mode and the second alternative is guided as a distance precedent mode.

When the charge precedent is inputted through the user input device 154 (S18: YES), the process is advanced to step S19. When the charge precedent is not inputted (S18: NO), step S18 is repeated. At that time, it may be configured to receive the cancel command in a similar way to step S9.

Figure 4:
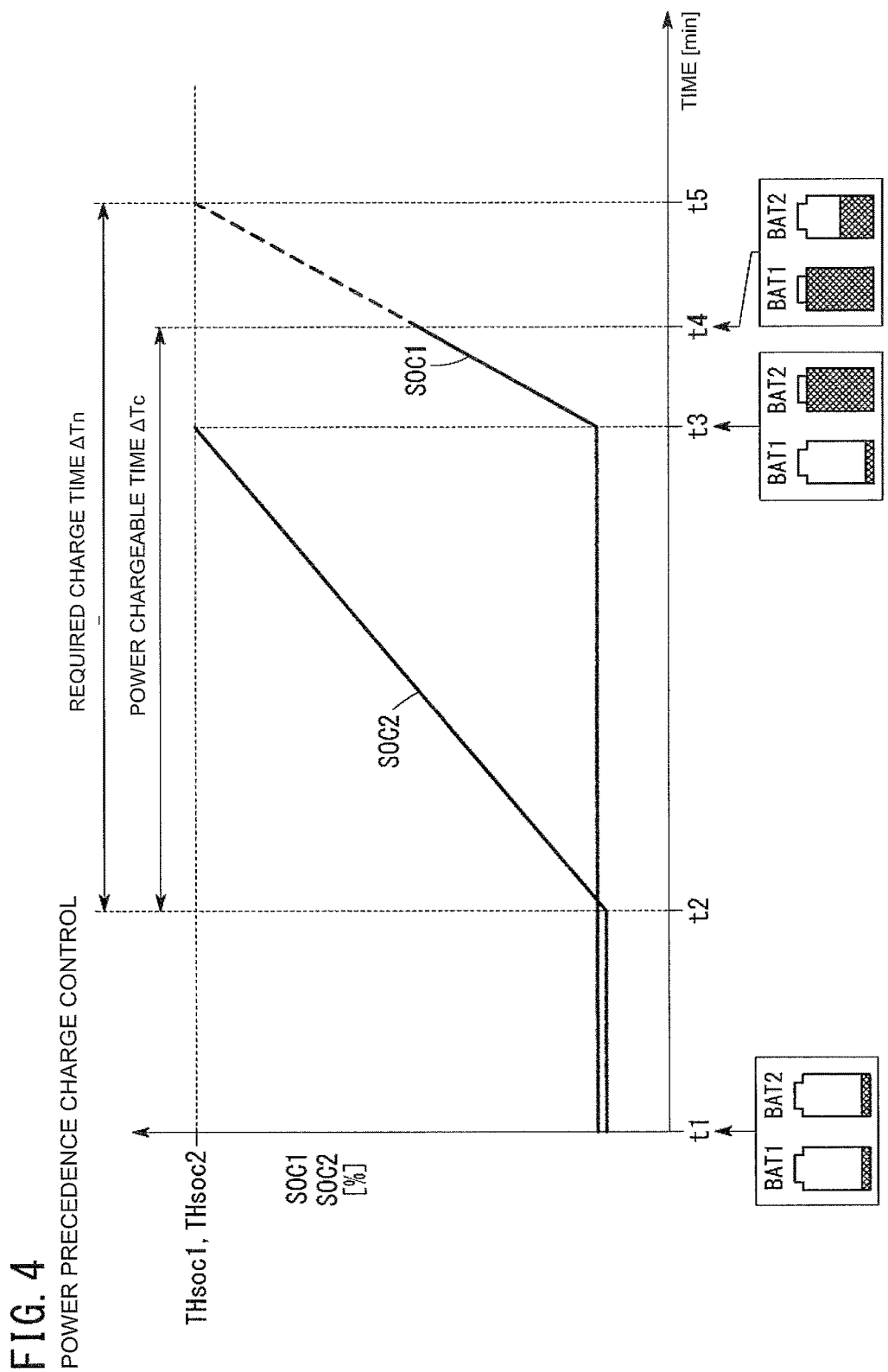
FIG. 4 is a diagram showing an example of residual capacity change of a battery by power precedence charge control in accordance with the embodiment.
Figure 5:
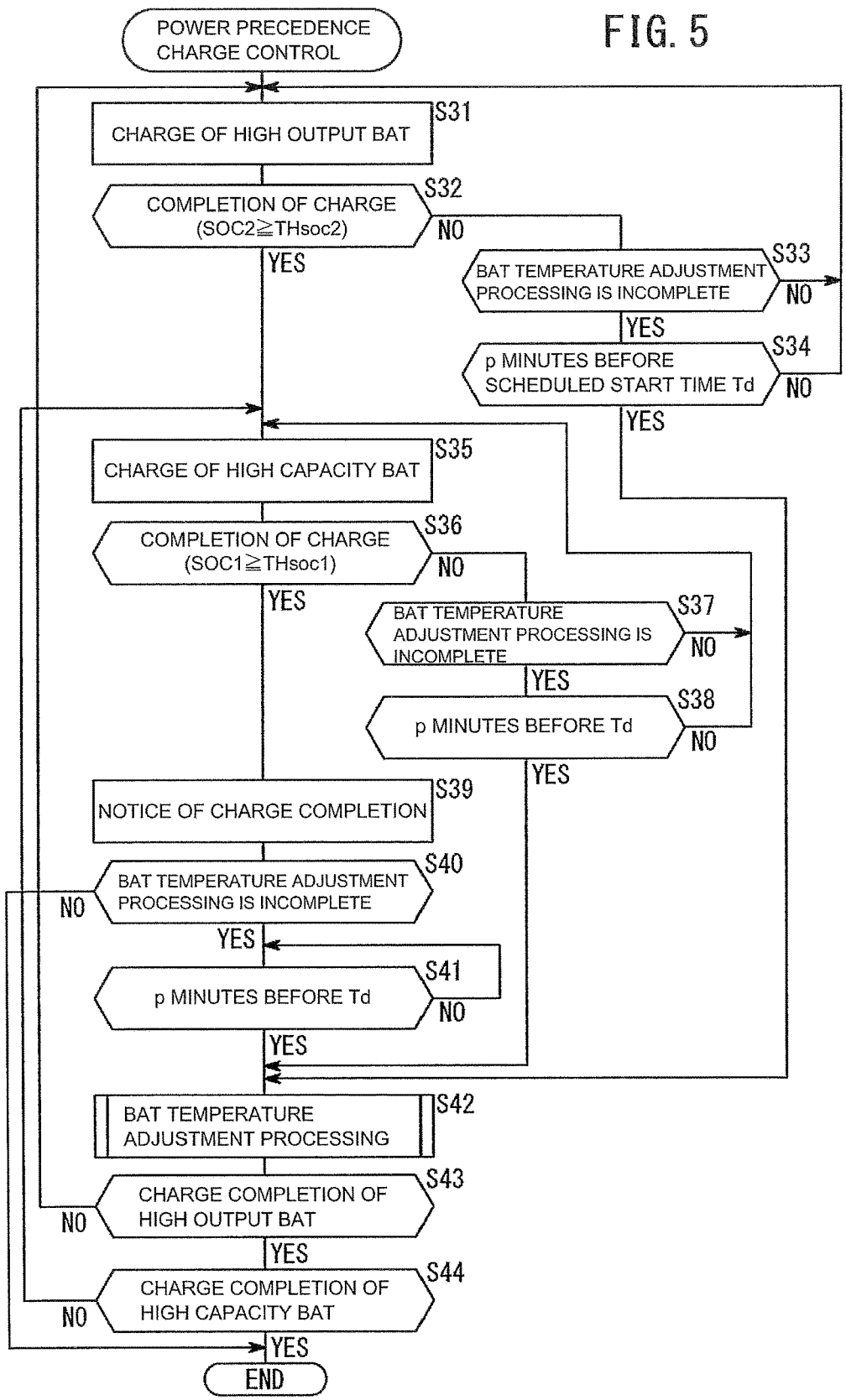
FIG. 5 is a flow chart of the power precedence charge control in accordance with the embodiment.
Figure 6:
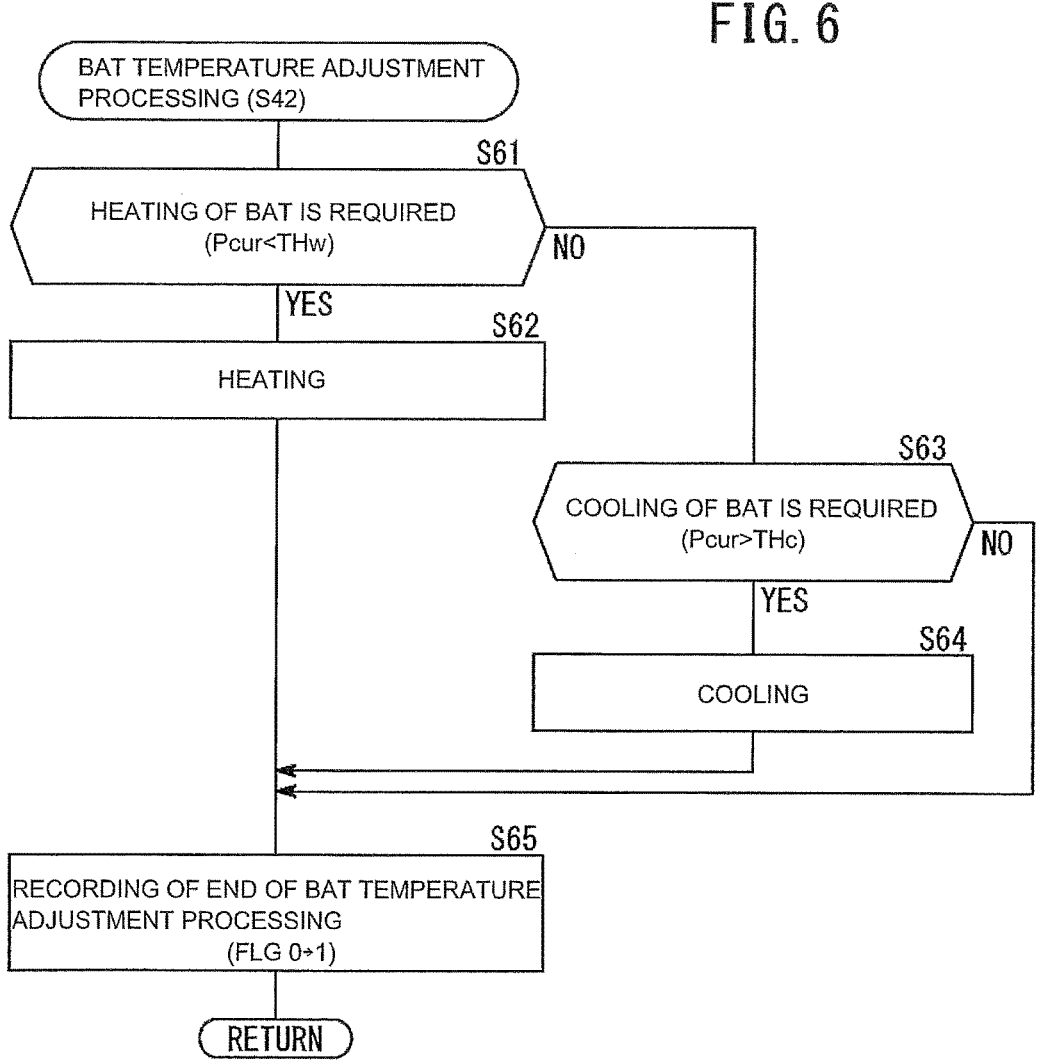
FIG. 6 is a flow chart of battery temperature adjustment processing in accordance with the embodiment.
Figure 7:
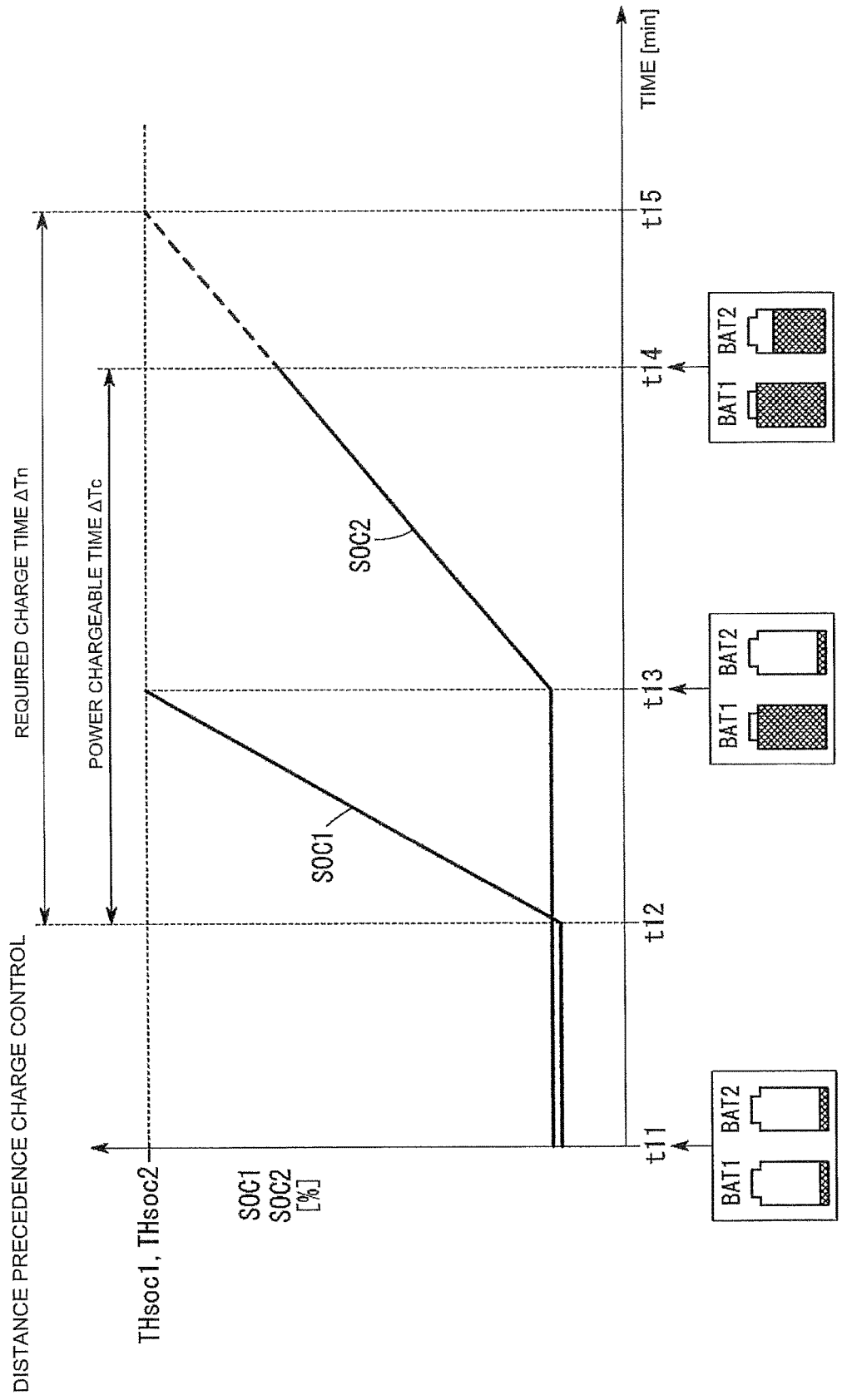
FIG. 7 is a diagram showing an example of the residual capacity change of the battery by distance precedence charge control in accordance with the embodiment.
Figure 8:
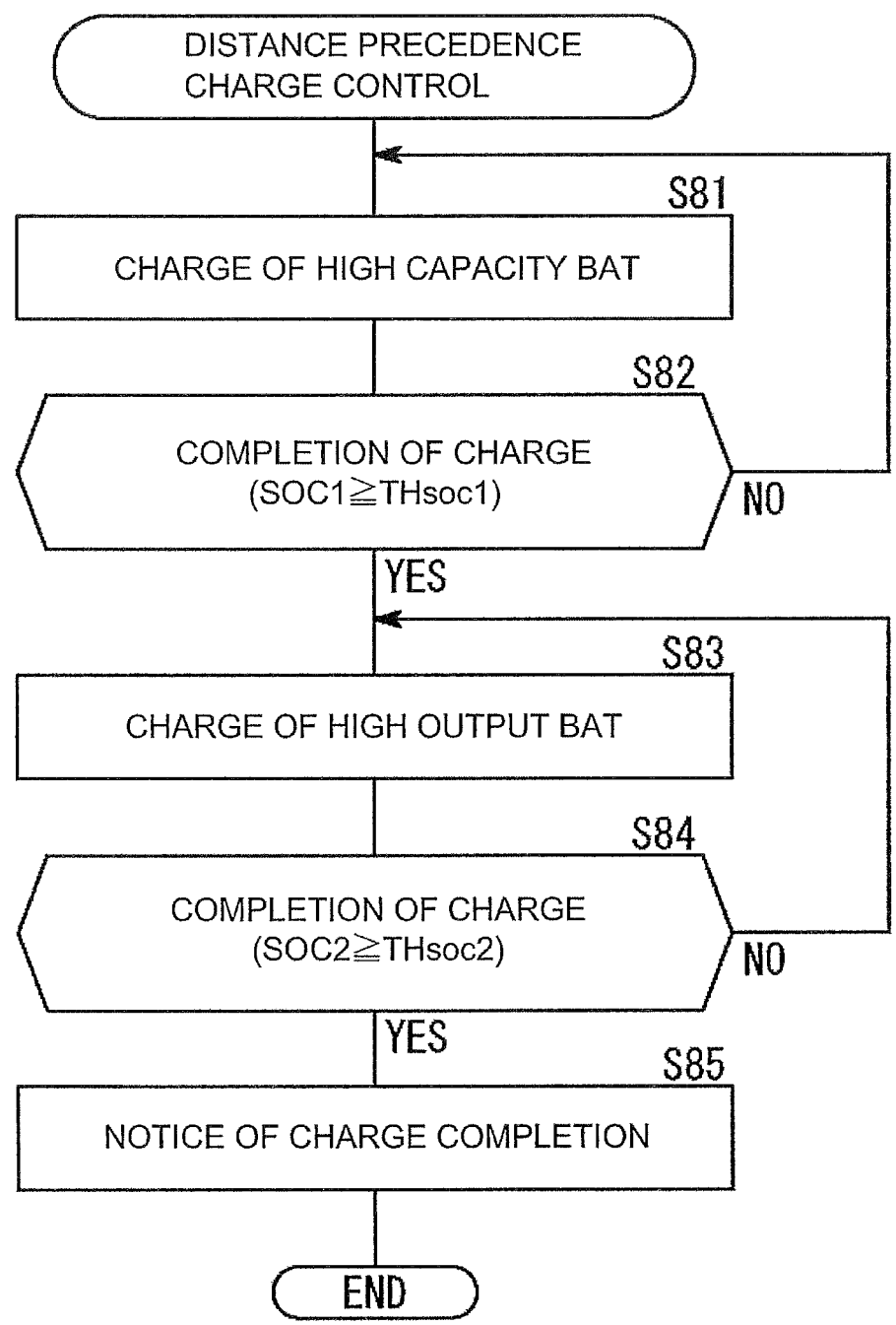
FIG. 8 is a flow chart of the distance preference charge control in accordance with the embodiment.

In step S19, the charge control device 162 selects the charge precedence inputted in step S18. When the power precedence mode (that the high output battery 54 is first and the high capacity battery 52 follows) is selected, the charge control device 162 executes power precedence charge control (FIGS. 4 to 6). When the distance precedence mode (that the high capacity battery 52 is first and the high output battery 54 follows) is selected, the charge control device 162 executes the distance precedence charge control (FIGS. 7 and 8).

[I-B-3: Power Precedence Charge Control]

(I-B-3-1: Outline of the Power Precedence Charge Control)

FIG. 4 is a diagram showing an example of changes of the residual capacities SOC1, SOC2 of the batteries 52, 54 by the power precedence charge control in accordance with the embodiment. In FIG. 4, the horizontal axis is time, and the vertical axis is SOC1, SOC2. Further, in FIG. 4, the high capacity battery 52 is indicated as "BAT1" and the high output battery 54 is indicated as "BAT2".

At points of time t1 to t2, the batteries 52, 54 are not charged. At the point of time t2, the power precedence control is started. At points of time t2 to t3, the high output battery 54 is preferentially charged. At the point of time t3, the charge of the high capacity battery 52 is started at the time the charge of the high output battery 54 is completed. At a point of time t4, since the power chargeable time ΔTc passes and the vehicle 12 is started, the power charge ends before the point of time t5 at which the high output battery 54 is fully charged.

(I-B-3-2: Overall Flow of Power Precedence Charge Control)

FIG. 5 is a flow chart of the power precedence charge control in accordance with the embodiment. As described above, in the power precedence charge control, the high output battery 54 is charged first, and the high capacity battery 52 is charged thereafter.

In step S31, the charge control device 162 allows the high output battery 54 to be charged. Concretely, the charge control device 162 transmits the charge command (high output battery charge command) of the high output battery 54 to the battery ECU 32 of the vehicle 12. The battery ECU 32 which has received the high output battery charge command turns on the contactors 62a, 62b on the high output battery 54 side and the contactors 64a, 64b on the external charge device 14 side in a condition where the contactors 60a, 60b on the high capacity battery 52 side are turned off. At that time, the high output battery 54 and the external charge device 14 are directly connected to each other without the intermediary of the converter 56 (see FIG. 2).

In step S32, the charge control device 162 determines whether or not the charge of the high output battery 54 is completed. Concretely, the charge control device 162 obtains SOC2 of the high output battery 54 from the battery ECU 32 and determines whether or not SOC2 becomes not less than a second SOC threshold value THsoc2 (hereinafter, also referred to as "threshold value THsoc2"). The threshold value THsoc2 (target residual capacity) in this embodiment indicates the full charge of the high output battery 54. As referred to later, the threshold value THsoc2 may be set to another value.

When the charge of the high output battery 54 is not completed (S32: NO), the charge control device 162 determines whether or not the battery temperature adjustment processing is incomplete in the present power precedent charge control, in step S33. This determination is performed by using a flag FLG indicating the completion of the battery temperature adjustment processing (hereinafter, also referred to as "BAT temperature adjustment processing"), for example. Concretely, when the flag FLG is zero, it indicates that the BAT temperature adjustment processing is incomplete. When the flag is 1, it indicates that the BAT temperature adjustment processing is completed.

When the BAT temperature adjustment processing is incomplete (S33: YES), in step S34, the charge control device 162 determines whether or not it is accomplished at p minutes before the scheduled start time Td. The value p is the time for performing the BAT temperature adjustment processing. In this embodiment, the value p is a fixed value. Or alternatively, the value p may be variable based on a current temperature Pcur (hereinafter, also referred to as "current battery temperature Pcur") of the high output battery 54. Moreover, when the value p is set to zero, it is possible to perform the BAT temperature adjustment processing after the scheduled start time Td.

When it is accomplished at p minutes before the scheduled start time Td (S34: YES), the process is advanced to step S42. In the case where the BAT temperature adjustment processing is completed (S34: NO) or where it is not accomplished at p minutes before the scheduled start time Td (S34: NO), the process is returned to step S31 and the charge of the high output battery 54 is continued.

Returning to step S32, when the charge of the high output battery 54 is completed (S32: YES), the charge control device 162 allows the high capacity battery 52 to be charged, in step S35.

Concretely, the charge control device 162 transmits the charge command (high capacity battery charge command) of the high capacity battery 52 to the battery ECU 32 of the vehicle 12. The battery ECU 32 which has received the high capacity battery charge command turns on the contactors 60a, 60b on the high capacity battery 52 side and the contactors 64a, 64b on the external charge device 14 side in a condition where the contactors 62a, 62b on the high output battery 54 side are turned off. In addition, the battery ECU 32 operates the converter 56 thereby to transform (herein, step up) the supply voltage Vc from the external charge device 14 so as to supply it to the high capacity battery 52.

In step S36, the charge control device 162 determines whether or not the charge of the high capacity battery 52 is completed. Concretely, the charge control device 162 obtains SOC1 of the high capacity battery 52 from the battery ECU 32 and determines whether or not SOC1 becomes not less than a first SOC threshold value THsoc1 (hereinafter, also referred to as "threshold value THsoc1"). The threshold value THsoc1 (target residual capacity) in this embodiment indicates the full charge of the high capacity battery 52. As referred to later, the threshold value THsoc1 may be set to another value.

When the charge of the high capacity battery 52 is not completed (S36: NO), the charge control device 162 determines whether or not the battery temperature adjustment processing is incomplete in the present power precedent charge control, in step S37. When the BAT temperature adjustment processing is incomplete (S37: YES), in step S38, the charge control device 162 determines whether or not it is accomplished at p minutes before the scheduled start time Td. Step S37 and step S38 are similar to step S33 and step S34.

When it is accomplished at p minutes before the scheduled start time Td (S38: YES), the process is advanced to step S42. In the case where the BAT temperature adjustment processing is completed (S37: NO) or where it is not accomplished at p minutes before the scheduled start time Td (S38: NO), the process is returned to step S35 and the charge of the high capacity battery 52 is continued.

Returning to step S36, when the charge of the high capacity battery 52 is completed (S36: YES), the charge control device 162 allows the display device 156 to display a notice (charge completion notice) that the charges of both batteries 52, 54 have been completed, in step S39. In addition to or instead of the display on the display device 156, the charge control device 162 may send the charge completion notice to the portable terminal 16. The portable terminal 16 which has received the charge completion notice displays the charge completion notice on the display device 224.

In the following step S40, the charge control device 162 determines whether or not the battery temperature adjustment processing is incomplete in the present power precedence charge control. Step S40 is similar to steps S33 and S37. When the BAT temperature adjustment processing is incomplete (S40: YES), the process is advanced to step S41. When the BAT temperature adjustment processing is completed (S40: NO), the present power precedence charge control ends.

In step S41, the charge control device 162 determines whether or not it is accomplished at p minutes before the scheduled start time Td. Step S41 is similar to steps S34 and S38. When it is not accomplished at p minutes before the scheduled start time Td (S41: NO), step S41 is repeated.

When it is accomplished at p minutes before the scheduled start time Td (S41: YES), in step S42, the charge control device 162 executes the battery (BAT) temperature adjustment processing. The details of the BAT temperature processing will be referred to later with reference to FIG. 6.

After the BAT temperature adjustment processing (S42), the charge control device 162 determines whether or not the charge of the high output battery 54 is completed, in step S43. Step S43 is similar to step S32. When the charge of the high output battery 54 is completed (S43: YES), the process is advanced to step S44. When the charge of the high output battery 54 is not completed (S43: NO), the process is returned to step S31.

In step S44, the charge control device 162 determines whether or not the charge of the high capacity battery 52 is completed. Step S44 is similar to step S36. When the charge of the high capacity battery 52 is completed (S44: YES), the present power precedence charge control ends. When the charge of the high capacity battery 52 is not completed (S44: NO), the process is returned to step S35.

(I-B-3-3: Battery Temperature Adjustment Processing)

FIG. 6 is a flow chart of the battery temperature adjustment processing in accordance with this embodiment. In step S61, the charge control device 162 determines whether or not it is necessary to heat the high output battery 54. Concretely, the charge control device 162 determines whether or not the current temperature Pcur of the high output battery 54 obtained from the battery ECU 32 is lower than a heating threshold value THw (hereinafter, also referred to as "threshold value THw"). The threshold value THw is a threshold value for determining whether or not the discharge of the high output battery 54 can be fully performed since the current temperature Pcur is excessively low.

When the high output battery 54 is required to be heated (S61: YES), in step S62, the charge control device 162 executes heating processing for heating the high output battery 54 with the heating device 28. Concretely, the charge control device 162 transmits a heating command (high output battery heating command) of the high output battery 54 to the battery ECU 32 of the vehicle 12. The battery ECU which has received the high output battery heating command operates the heating device 28 thereby to heat the high output battery 54. After step S62, the process is advanced to step S65.

When the high output battery 54 is not required to be heated (S61: NO), in step S63, the charge control device 162 determines whether or not the high output battery 54 is required to be cooled. Concretely, the charge control device 162 determines whether or not the current temperature Pcur of the high output battery 54 obtained from the battery ECU 32 is higher than a cooling threshold value THc (hereinafter, also referred to as "threshold value THc"). The threshold value THc is a threshold value for determining whether or not the discharge of the high output battery 54 can be fully performed since the current temperature Pcur is excessively high.

When the high output battery 54 is required to be cooled (S63: YES), in step S64, the charge control device 162 executes cooling processing for cooling the high output battery 54. Concretely, the charge control device 162 transmits a cooling command (high output battery cooling command) of the high output battery 54 to the battery ECU 32 of the vehicle 12. The battery ECU which has received the high output battery cooling command operates the cooling device 30 thereby to cool the high output battery 54.

After step S62 or step S64, or when the high output battery 54 is not required to be cooled (S63: NO), the process is advanced to step S65. In step S65, the charge control device 162 records the end of the BAT temperature adjustment processing. For example, the charge control device 162 shifts the flag FLG from zero to 1.

[I-B-4: Distance Precedence Charge Control]
(I-B-4-1: Outline of the Distance Precedence Charge Control)

FIG. 7 is a diagram showing an example of changes of the residual capacities SOC1, SOC2 of the batteries 52, 54 by the distance precedence charge control in accordance with the embodiment. In FIG. 7, the horizontal axis is time, and the vertical axis is SOC1, SOC2. Further, in FIG. 7, the high capacity battery 52 is indicated as "BAT1", and the high output battery 54 is indicated as "BAT2".

At points t11 to t12 of time, the batteries 52, 54 are not charged, and at a point t12 of time, the distance precedence charge control is started. At points t12 to t13 of time, the high capacity battery 52 is preferentially charged. When the charge of the high capacity battery 52 is completed at the point 13t, the charge of the high output battery 54 is started. At a point t14 of time, the power chargeable time ΔTc passes and the vehicle 12 is started. Therefore, the power charge ends before a point 15t of time at which the high output battery 54 is fully charged.

(I-B-4-2: Overall Flow of Distance Precedence Charge Control)

FIG. 8 is a flow chart of the distance preference charge control in accordance with the embodiment. As described above, in the distance precedence charge control, the high capacity battery 52 is charged first, and thereafter, the high output battery 54 is charged.

In step S81, the charge control device 162 allows the high capacity battery 52 to be charged. In step S82, the charge control device 162 determines whether or not the charge of the high capacity battery 52 is completed. Steps S81 and S82 are similar to steps S35 and S36 of FIG. 5.

When the charge of the high capacity battery 52 is not completed (S82: NO), the process is returned to step S81 and the charge of the high capacity battery 52 is continued. When the charge of the high capacity battery 52 is completed (S82: YES), the process is advanced to step S83.

In step S83, the charge control device 162 allows the high output battery 54 to be charged. In step S84, the charge control device 162 determines whether or not the charge of the high output battery 54 is completed. Steps S83 and S84 are similar to steps S31 and S32 of FIG. 5.

When the charge of the high output battery 54 is not completed (S84: NO), the process is returned to step S83 and the charge of the high output battery 54 is continued. When the charge of the high output battery 54 is completed (S84: YES), the process is advanced to step S85. Step S85 is similar to step S39 of FIG. 5.

<I-C: Effects of this Embodiment>

As described above, according to this embodiment, when the power chargeable time ΔTc is shorter than the required charge time ΔTn (S15 of FIG. 3: NO), either one or both of the high capacity battery (first power storage device) 52 and the high output battery (second power storage device) 54 are charged according to the precedence (including the order) which is set by the user (FIGS. 4, 5, 7 and 8). Therefore, the charging condition in compliance with the request of the user can be obtained, so that it is possible to improve the convenience of the user and the merchantability of the electric power supply system 10.

For example, in the case where the user wants to perform the high output drive of the vehicle 12 immediately after charging, it is possible to satisfy the user's request by raising the charge precedence of the high output battery 54 even if the power chargeable time ΔTc is short.

In this embodiment, the electric power supply system 10 includes the temperature sensor 26 for detecting the current temperature Pcur of the high output battery (second power storage device) 54, and the heating device 28 for heating the high output battery 54 (FIG. 1). In the case where the power chargeable time ΔTc is shorter than the required charge time ΔTn (S15 of FIG. 3: NO) and the high output battery 54 has higher precedence than the high capacity battery (first power storage device) 52, the battery ECU 32 (the charge control device) is configured to allow the high output battery 54 to be heated (S62) by the heating device 28 when the current temperature Pcur of the high output battery 54 is lower than the heating threshold value (first temperature threshold value) THw (S61 of FIG. 6: YES) at the predetermined timing (S34 of FIG. 5: YES or S38: YES) prior to the scheduled start time (scheduled use start time) Td or at the timing of the scheduled start time Td.

Even if the high output battery 54 is charged on a preferential basis, there is a possibility that the output is restricted when the current temperature Pcur of the high output battery 54 is excessively low. According to this embodiment, in the case where the high output battery 54 is charged on a preferential basis, the high output battery 54 is heated when the current temperature Pcur of the high output battery 54 is lower than the heating threshold value (first temperature threshold value) THw. Therefore, the high output battery 54 can easily produce the desired output at the timing of the scheduled start time (scheduled use start time) Td.

In this embodiment, the electric power supply system 10 includes the temperature sensor 26 for detecting the current temperature Pcur of the high output battery (second power storage device) 54, and the cooling device 30 for cooling the high output battery 54 (FIG. 1). In the case where the power chargeable time ΔTc is shorter than the required charge time ΔTn (S15 of FIG. 3: NO) and the high output battery (second power storage device) 54 has higher precedence than the high capacity battery (first power storage device) 52, the battery ECU 32 (the charge control device) is configured to allow the high output battery 54 to be cooled (S64) by the cooling device 30 when the current temperature Pcur of the high output battery 54 is higher than the cooling threshold value (second temperature threshold value) THc (S63 of FIG. 6: YES) at the predetermined timing prior to the scheduled start time (scheduled use start time) Td or at the timing of the scheduled start time Td (S34 of FIG. 5: YES or S38: YES).

Even if the high output battery 54 is charged on a preferential basis, there is a possibility that the output is restricted when the current temperature Pcur of the high output battery 54 is excessively high. According to this embodiment, in the case where the high output battery 54 is charged on a preferential basis, the high output battery 54 is cooled when the current temperature Pcur of the high output battery 54 is higher than the cooling threshold value (second temperature threshold value) THc. Therefore, the high output battery 54 can easily produce the desired output at the timing of the scheduled start time Td.

In this embodiment, the electric power supply system 10 includes the display device (guide section) 156 for outputting the guide display and the speaker (guide section) 158 for outputting the guide voice to the user (FIG. 1). The battery ECU (power charge control device) 32 is configured to allow the guide display and the guide voice which requests the user to input the scheduled start time (scheduled use start time) Td at the predetermined timing, to be outputted to the display device 156 and the speaker 158 (S10 of FIG. 3). The power chargeable time calculation section 202 is configured to calculate the power chargeable time ΔTc based on the scheduled start time Td and the current time Tcur which are inputted through the user input device 154 (S12 of FIG. 3).

In the case where the power chargeable time ΔTc is shorter than the required charged time ΔTn (S15 of FIG. 3: NO), the battery ECU 32 (charge control device) allows the display device 156 and the speaker 158 to output the display and voice for guiding the input of the precedence, to the user (S17 of FIG. 3). Thereafter, it allows the high capacity battery 52 or the high output battery 54 to be charged on a preferential basis according to the precedence which is inputted into the user input device 154. When the power chargeable time ΔTc is longer than the required charge time ΔTn (S15: YES), the battery ECU 32 allows the high capacity battery 52 and the high output battery 54 to be charged on the preferential basis of predetermined default without requesting the input of the precedence (S16 of FIG. 3).

With this configuration, in the case where the power chargeable time ΔTc is shorter than the required charge time ΔTn, the high capacity battery 52 and the high output battery 54 can be charged according to the precedence in compliance with a user's taste every time it is charged. Further, if the input of the precedence of the power charge is guided only when the power chargeable time ΔTc is shorter than the required charge time ΔTn, the user may input the precedence only at the time the input is needed, whereby the convenience of the user can be improved.

II: Modified Embodiment

By the way, the present invention is not limited to the above described embodiment, and it is a matter of course that various configurations can be employed based on the description of this specification. For example, the following configuration can be adopted.

<II-A: Subject of Application>

Although, in the above embodiment, the electric power supply system 10 is applied to the configuration including the vehicle 12 (FIG. 1), it can be applied to another subject without being limited to that. The electric power supply system 10 may be applied to a moving object such as a robot, a flying surveillance robot "Drone" and the like, for example. Or alternatively, the electric power supply system 10 is applicable to manufacturing equipment.

<II-B: Detection or Recognition of User (Human Detection Device 160)>

In the above embodiment, the detection or recognition of the user is performed by using the human detection device 160 (FIG. 1, S1 of FIG. 3). However, from a viewpoint of charging either one or both of the high capacity battery 52 and the high output battery 54 based on the precedence inputted through the user input device 154 for example, it is not limited to that. The process may be advanced to step 7 of FIG. 3, for example, by allowing the external charge device 14 to detect the connection between the vehicle side connector 58 and the charge device side connector 174 (only step S2 of FIG. 3, for example). Or alternatively, the process may be advanced to step S7 for starting the power charge, by the input to the user input device 154 (for example, operation of an operation button) by the user.

<II-C: Electric Vehicle 12>

[II-C-1: Kinds of Electric Vehicles 12]

In the above embodiment, the vehicle 12 is an electric motor vehicle (battery vehicle), in a narrow sense, which has the batteries 52 and 54 as an electric power supply source to the motor 20 (FIG. 1). However, for example, from a viewpoint of having two or more power storage devices, it is not limited to that. The vehicle 12 may be a hybrid vehicle, a fuel cell powered vehicle, etc., for example.

[II-C-2: Vehicle Electric Power System 22]

In the above embodiment, the converter 56 is arranged between the high output battery 54 and the connecting points 80, 82 (FIGS. 1 and 2). However, for example, from a viewpoint of charging either one or both of the high capacity battery 52 and the high output battery 54 based on the precedence inputted through the user input device 154, it is not limited to that. For example, the converter 56 may be arranged between the high capacity battery 52 and the connecting points 80, 82 without being arranged between the high output battery 54 and the connecting points 80, 82. Or alternatively, the converter 56 may be arranged not only between the high capacity battery 52 and the connecting points 80, 82 but also between the high output battery 54 and the connecting points 80, 82.

Figure 9:
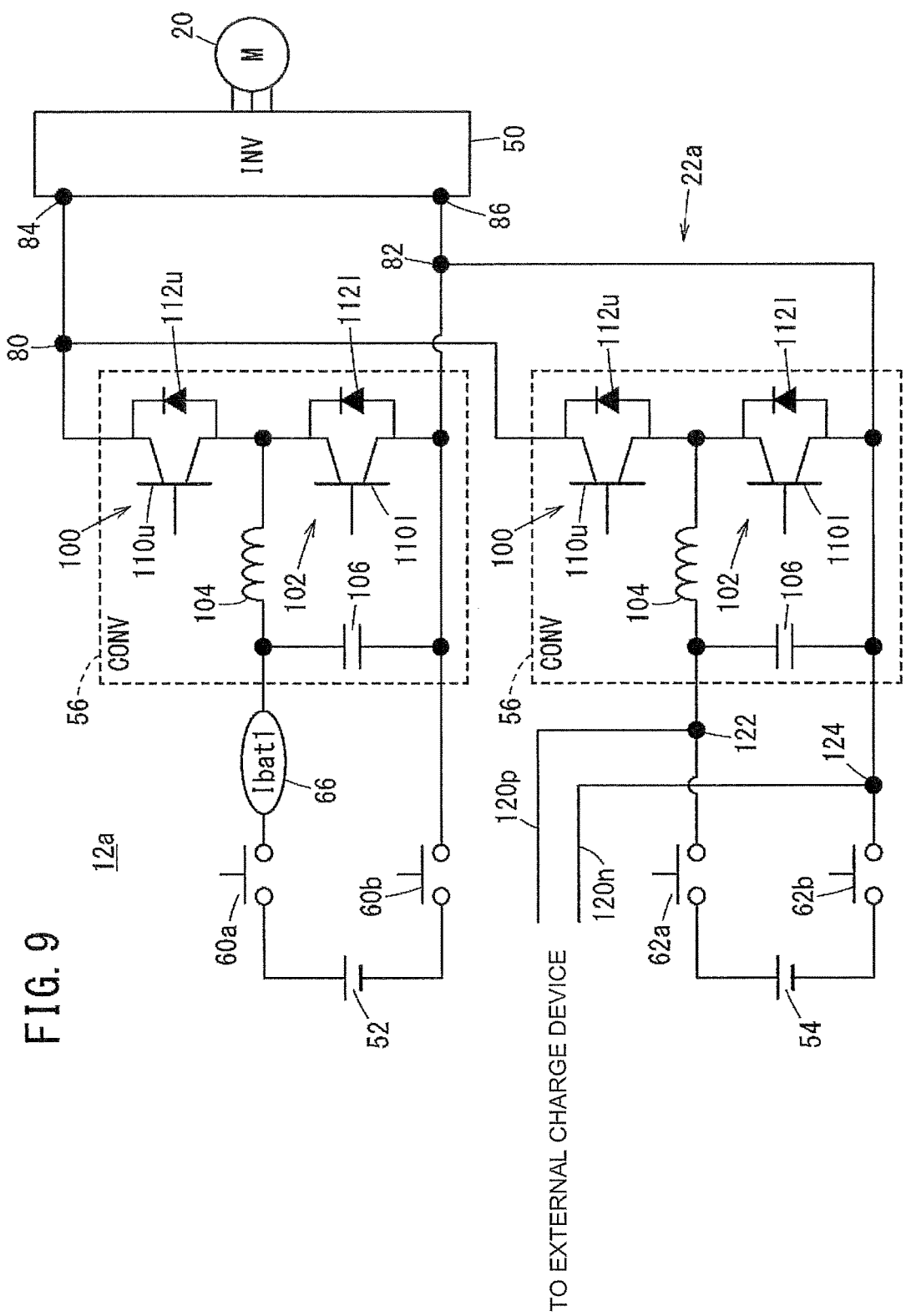
FIG. 9 is a circuit diagram of a vehicle electric power system in accordance with a modified embodiment.

FIG. 9 is a circuit diagram of the vehicle electric power system 22a in accordance with the modified embodiment. The electric power system 22a is applied to the electric vehicle 12a. In the vehicle electric power system 22a, the converters 56 are arranged both between the high capacity battery 52 and the connecting points 80, 82 and between the high output battery 54 and the connecting points 80, 82. With this configuration, the output voltages Vbat1, Vbat2 of each of the batteries 52, 54 are controllable by each of the converters 56. Accordingly, the supply voltages to the inverter 50 can be varied more flexibly. In addition, when the batteries 52, 54 are charged at the same time, the distribution of the electric power can be easily adjusted.

[II-C-3: Electric Power Supply System]

In the above embodiment, the electric power supply system is configured as a contact electric power supply system in which the vehicle side connector 58 is connected to the charge device side connector 174 (FIG. 1). However, for example, from a view point of charging two or more power storage devices by using the precedence, it is not limited to that, and it is possible to charge the batteries 52, 54 from the external charge device 14 by non-contact electric power supply (radio electric power supply). In the case of the non-contact electric power supply, since the step (S2 and S4 of FIG. 3) which requires the connection between the vehicle side connector 58 and the charge device side connector 174 is not needed, there is a possibility that the convenience of the user is improved.

<II-D: Batteries 52, 54 (Power Storage Device)>

In the above embodiment, although the vehicle electric power system 22 has two power storage devices (the high capacity battery 52 and the high output battery 54) of different type, the number of the power storage device is not limited to that, and three or more power storage devices may be employed.

<II-E: Heating Device 28 and Cooling Device 30>

In the above embodiment, the heating device 28 and the cooling device 30 are provided for the battery temperature adjustment processing of FIG. 6 (FIG. 1). However, for example, from a viewpoint of charging either one or both of the high capacity battery 52 and the high output battery 54 based on the precedence inputted through the user input device 154, it is not limited to that. It is possible to dispense with either one or both of the heating device 28 and the cooling device 30, for example.

In the above embodiment, although the heating device 28 and the cooling device 30 are provided for the high output battery (second power storage device) 54 (FIGS. 1 and 6), either one or both of the heating device 28 and the cooling device 30 may be provided for the high capacity battery (first power storage device) 52.

<II-F: Charge Precedence Setting Control>

[II-F-1: Execution Subject]

In the above embodiment, the execution subject of the charge precedence setting control is mainly the charge control device 162 of the external charge device 14 (FIG. 3). However, for example, from a viewpoint of charging either one or both of the high capacity battery 52 and the high output battery 54 based on the precedence inputted through the user input device 154, it is not limited to that. The ECU 32 of the vehicle 12 or the terminal control device 228 of the portable terminal 16 may be used as the execution subject (charge control device) of the charge precedence setting control, for example. Or alternatively, when the server which is not shown in the drawing is provided, the server may be configured to execute the charge precedence setting control in a condition where the server is capable of communicating with the external charge device 14. The same applies to the power precedence charge control and the distance precedence charge control.

[II-F-2: Start Timing]

In the above embodiment, it is assumed that, when the both batteries 52, 54 are fully rechargeable (S15 of FIG. 3: YES), the power charge is started immediately after the charge precedence of the default is selected (S16). However, for example, from a viewpoint of charging either one or both of the high capacity battery 52 and the high output battery 54 based on the precedence inputted through the user input device 154, it is not limited to that. The charge control device 162 can be configured such that the power charge is started so as to complete the power charge at the scheduled start time Td or at the predetermined time before the scheduled start time (in other words, be configured to make a reservation of the power charge), for example. With this configuration, although, when the power charge is performed quickly, the deterioration of the batteries 52, 54 is easy to be advanced that much, it is possible to suppress the deterioration of the batteries 52, 54.

[II-F-3: Power Chargeable Time ΔTc and Required Charge Time ΔTn]

In the above embodiment, the first SOC threshold value THsoc1 is used as the value of the full charge of the high capacity battery 52, and the second SOC threshold value THsoc2 is used as the value of the full charge of the high output battery 54 (FIGS. 4 and 7). However, other values may be set as the threshold values THsoc1, THsoc2.

In the above embodiment, the threshold values THcos1 and THsoc2 are set as the fixed values (FIGS. 4 and 7). However, from a viewpoint of considering the convenience of the user, it is possible to set the threshold values THsoc1, THsoc2 as variable values. In this case, the user may set the threshold values THsoc1, HTsoc2 through the portable terminal 16 in a condition where the portable terminal 16 is capable of communicating with the external charge device 14.

In the above embodiment, the necessity of the charge precedence is confirmed by making a comparison between the power chargeable time ΔTc [min] and the required charge time ΔTn [min] as a length of time (S15 of FIG. 3). However, for example, from a viewpoint of allowing the user to select the charge precedence when the power charge of the plural power storage devices is not completed before the schedule start time (schedule use start time) Td, it is not limited to that. Instead of the comparison between the power chargeable time ΔTc and the required charge time ΔTn, the comparison between the scheduled start time (scheduled use start time) Td and a charge completion estimation time Tf may be used.

In the case of using the comparison between the scheduled start time (or the scheduled use start time) Td and the charge completion estimation time Tf, the charge control section 200 of the external charge device 14 has a charge completion estimation time calculation section (hereinafter, referred to as "estimation time calculation section") which is not shown in the drawing, instead of the power chargeable time calculation section 202 and the required charge time calculation section 204. The estimation time calculation section is configured to calculate the charge completion estimation time Tf based on the batteries 52, 54 and the battery information INbat.

In the case of using the estimation time calculation section, step S12 of FIG. 3 is dispensed with. Further, in step S14, the estimation time calculation section calculates the charge completion estimation time Tf based on the SOC1, the SOC2 and the battery information INbat.

In step S15, the charge control device 162 determines whether or not both batteries 52, 54 can be charged in the full charge condition by the scheduled start time Td. This determination is performed based on whether the charge completion estimation time Tf is not later than the schedule start time Td.

[II-F-4: Charge Precedence]

In the above embodiment, the charge precedence is synonymous with the order of the power charge (FIGS. 4, 5, 7 and 8). However, for example, from a viewpoint of charging either one or both of the high capacity battery 52 and the high output battery 54 based on the precedence inputted through the user input device 154, it is not limited to that. For example, the ratio at which the electric power is distributed at the time of simultaneously charging the batteries 52, 54 may be prescribed by the precedence.

Figure 10:
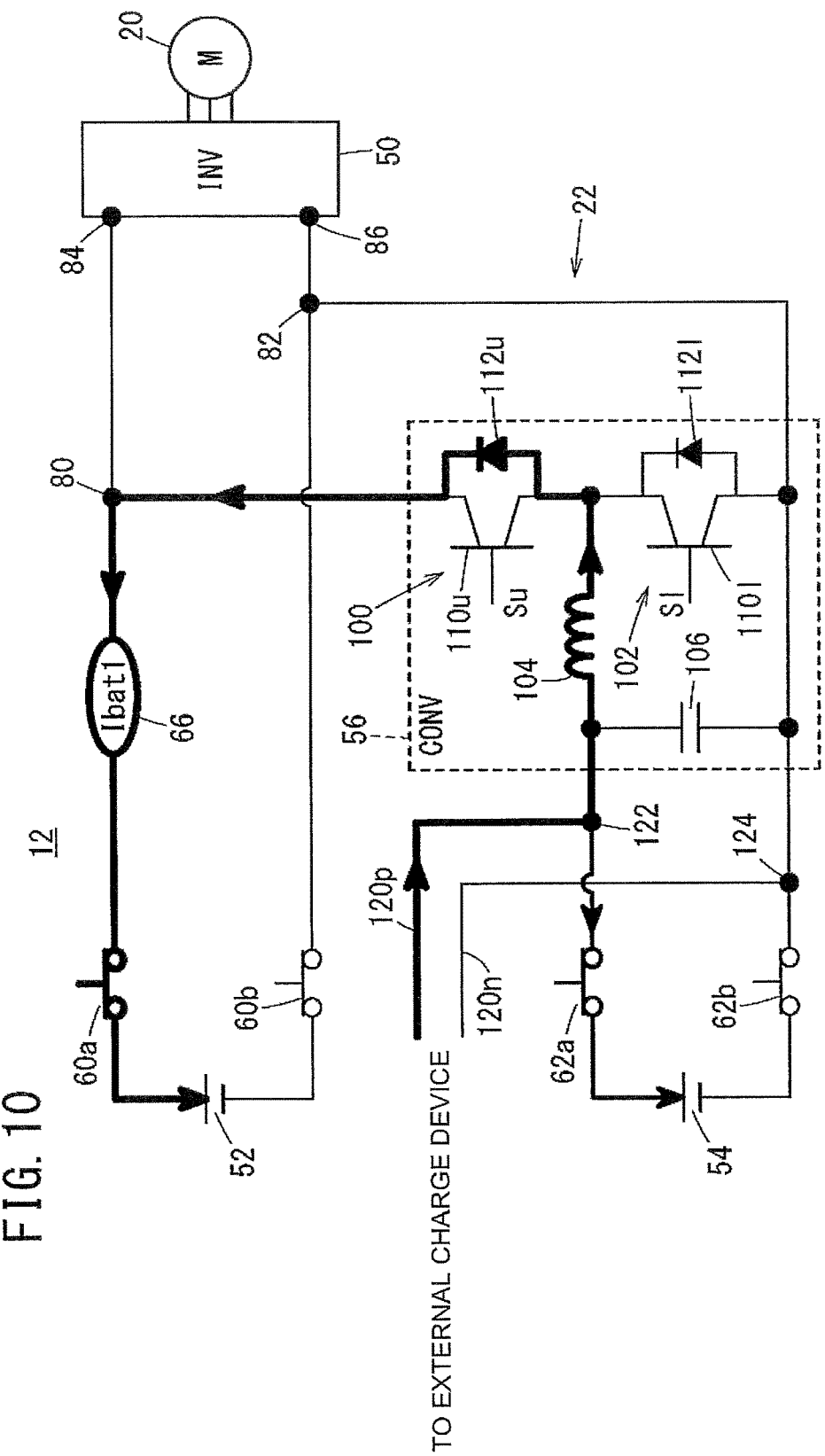
FIG. 10 is a circuit diagram of the vehicle electric power system at the time of executing the distance preference charge control in accordance with the modified embodiment.

FIG. 10 is a circuit diagram of the vehicle electric power system 22 at the time of executing the distance preference charge control in accordance with the modified embodiment. As described above, in the distance precedence control, the high capacity battery 52 is preferentially charged.

In the embodiment of FIG. 10, the contactors 60a, 60b, 62a, 62b are tuned on. Further, although not shown in FIG. 10, the contactors 64a, 64b also are tuned on. Then, the battery ECU 32 is configured to adjust the drive duty ratio of the switching element 1101 of the lower arm 102 such that much electric power is supplied to the high capacity battery 52. At that time, the ECU 32 sets the target value of the input and output current Ibat1 and performs feedback control of the switching element 1101 such that the input and output current Ibat1 corresponds to the target value.

Or alternatively, in the case of the power precedence control, it is possible to rapidly charge the high output battery 54 by supplying the electric power also from the high capacity battery 52 in addition to the external charge device 14. In this case, the ECU 32 turns on the contactors 60a, 60b, 62a, 62b, 64a, 64b. Further, the ECU 32 adjusts the supply electric power Pbat1 from the high capacity battery 52 by stepping down the output voltage Vbat1 from the high capacity battery 52, by the converter 56. At that time, the ECU 32 sets the target value of the input and output current Ibat1 and controls the supply electric power Pb by controlling the converter 56 such that the input and output current Ibat1 corresponds to the target value.

[Description of Reference Characters]

10: Electric power system, 26: Temperature sensor, 28: Heating device,
30: Cooling device, 52: High capacity battery (First power storage device), 54: High output battery (Second power storage device),
154: User input device, 156: Display device (Guide section), 158: Speaker (Guide section), 162: Charge control device, 202: Power chargeable time calculation section, 204: Required charge time calculation section, Pbat: Temperature of high output battery, SOC1: Residual capacity of high capacity battery, SOC2: Residual capacity of high output battery, Tcur: Current time, Td: Scheduled start time (Scheduled use start time), THc: Cooling threshold value (Second temperature threshold value), THsoc1: First SOC threshold value (Target residual capacity), THsoc2: Second SOC threshold value (Target residual capacity), THw: Heating threshold value (First temperature threshold value), ΔTc: Power chargeable time, ΔTn: Required charge time According to the present embodiment when it is determined that the first power storage device and the second power storage device cannot be charged up to the target residual capacity until the next scheduled use start time, either one or both of the first power storage device and the second power storage device are charged according to the precedence (including order) which is inputted through the user input device. Therefore, the charging condition in compliance with the request of the user can be obtained, so that it is possible to improve the convenience of the user and the merchantability of the power supply system.

The power charge control device may comprise a power chargeable time calculation section for calculating an electric power chargeable time based on the current time and the scheduled use start time, and a required charge time calculation section for calculating a required charge time necessary to complete the power charge of the first power storage device and the second power storage device, based on a residual capacity of each of the first power storage device and the second power storage device.

When the power chargeable time is shorter than the required charge time, the power charge control device may be configured to allow either one or both of the first power storage device and the second power storage device to be charged according to the precedence which is inputted through the user input device.

With this configuration, when the power chargeable time is shorter than the required charge time, either one or both of the first power storage device and the second power storage device are charged according to the precedence (including order) which is inputted through the user input device. Therefore, the charging condition in compliance with the request of the user can be obtained, so that it is possible to improve the convenience of the user and the merchantability of the power supply system.

The electric power supply system may further comprise a temperature sensor for detecting a temperature of the second power storage device, and a heating device for heating the second power storage device. In the case where the power chargeable time is shorter than the required charge time and the second power storage device has higher precedence than the first power storage device, the power charge control device may be configured to allow the second power storage device to be heated by the heating device when the temperature of the second power storage device is lower than a first temperature threshold value at a predetermined timing prior to the scheduled use start time or at a timing of the scheduled use start time.

Even if the second power storage device of high output type is charged on a preferential basis, there is a possibility that the output is restricted when the temperature of the second power storage device is excessively low. According to the present embodiment, in the case where the second power storage device of high output type is charged on a preferential basis, the second power storage device is heated when the temperature of the second power storage device is lower than the first temperature threshold value. Therefore, the second power storage device of high output type can easily produce a desired output at the timing of the scheduled use start time.

The electric power supply system may further comprise the temperature sensor, and a cooling device for cooling the second power storage device. In the case where the power chargeable time is shorter than the required charge time and the second power storage device has higher precedence than the first power storage device, the power charge control device may be configured to allow the second power storage device to be cooled by the cooling device when the temperature of the second power storage device is higher than a second temperature threshold value at the predetermined timing prior to the scheduled use start time or at the timing of the scheduled use start time.

Even if the second power storage device of high output type is charged on a preferential basis, there is a possibility that the output is restricted when the temperature of the second power storage device is excessively high. According to the present embodiment, in the case where the second power storage device of high output type is charged on a preferential basis, the second power storage device is cooled when the temperature of the second power storage device is higher than the second temperature threshold value. Therefore, the second power storage device of high output type can easily produce a desired output at the timing of the scheduled use start time.

The electric power supply system may further comprise a guide section for outputting a guide display or a guide voice to the user. The power charge control device may be configured to allow the guide display or the guide voice which requests the user to input the scheduled use start time at a predetermined timing, to be outputted to the guide section. The power chargeable time calculation section may be configured to calculate the power chargeable time based on the scheduled use start time and the current time which are inputted through the user input device. In the case where the power chargeable time is shorter than the required charged time, the charge control device may be configured to allow the guide section to output the display or voice for guiding the input of the precedence, to the user, and thereafter, to allow the first power storage device or the second power storage device to be charged on a preferential basis according to the precedence which is inputted into the user input device. When the power chargeable time is longer than the required charge time, the charge control device may allow the first power storage device and the second power storage device to be charged on the preferential basis of predetermined default without requesting the input of the precedence.

With this configuration, in the case where the power chargeable time is shorter than the required charge time, the first power storage device or the second power storage device can be charged according to the precedence in compliance with a user's taste every time it is charged. Further, if the input of the precedence of the power charge is guided only when the power chargeable time is shorter than the required charge time, the user may input the precedence only at the time the input is needed, whereby the convenience of the user can be improved.

According to the present embodiment, it is possible to improve the convenience of the user in the case where plural kinds of power storage devices are provided.

Obviously, numerous modifications and variations of the present invention are possible in light of the above teachings. It is therefore to be understood that within the scope of the appended claims, the invention may be practiced otherwise than as specifically described herein.

What is claimed is:

1. An electric power supply system, comprising:
a first power storage device of high capacity type;
a second power storage device of high output type;
a charge control device for controlling power charge to the first power storage device and the second power storage device; and
a user input device for entering a command of a user;
wherein the power charge control device is configured to determine whether or not the first power storage device and the second power storage device can be charged up to a target residual capacity until a scheduled next use start time, and, when it is determined that the first power storage device and the second power storage device cannot be charged up to the target residual capacity until the scheduled use start time, either one or both of the first power storage device and the second power storage device are charged according to precedence which is inputted through the user input device to prioritize charge of one of the first power storage device and the second power storage device over charge of the other of the first power storage device and the second power storage device.

2. The electric power supply system according to claim 1, wherein the power charge control device comprises a power chargeable time calculation section for calculating an electric power chargeable time based on the current time and the scheduled use start time, and a required charge time calculation section for calculating a required charge time necessary to complete the power charge of the first power storage device and the second power storage device, based on a residual capacity of each of the first power storage device and the second power storage device, wherein, when the power chargeable time is shorter than the required charge time, the power charge control device is configured to allow either one or both of the first power storage device and the second power storage device to be charged according to the precedence which is inputted through the user input device.

3. The electric power supply system according to claim 2, further comprising a temperature sensor for detecting a temperature of the second power storage device, and a heating device for heating the second power storage device, wherein, when the power chargeable time is shorter than the required charge time and the second power storage device has higher precedence than the first power storage device, the power charge control device is configured to allow the second power storage device to be heated by the heating device when the temperature of the second power storage device is lower than a first temperature threshold value at a predetermined timing prior to the scheduled use start time or at a timing of the scheduled use start time.

4. The electric power supply system according to claim 2, further comprising a temperature sensor for detecting a temperature of the second power storage device, and a cooling device for cooling the second power storage device, wherein, when the power chargeable time is shorter than the required charge time and the second power storage device has higher precedence than the first power storage device, the power charge control device is configured to allow the second power storage device to be cooled by the cooling device when the temperature of the second power storage device is higher than a second temperature threshold value at the predetermined timing prior to the scheduled use start time or at the timing of the scheduled use start time.

5. The electric power supply system according to claim 2, further comprising a guide section for outputting a guide display or a guide voice to the user, wherein the power charge control device is configured to allow the guide display or the guide voice which requests the user to input the scheduled use start time at a predetermined timing, to be outputted to the guide section, and the power chargeable time calculation section is configured to calculate the power chargeable time based on the scheduled use start time and the current time which are inputted through the user input device, wherein, when the power chargeable time is shorter than the required charged time, the charge control device allows the guide section to output the display or voice for guiding the input of the precedence, to the user, and thereafter, allows the first power storage device or the second power storage device to be charged on a preferential basis according to the precedence which is inputted into the user input device, and wherein, when the power chargeable time is longer than the required charge time, the charge control device allows the first power storage device and the second power storage device to be charged on the preferential basis of predetermined default without requesting the input of the precedence.

6. The electric power supply system according to claim 1, wherein the first power storage device and the second power storage device are provided to supply electric power to a motor.

7. The electric power supply system according to claim 1, wherein the precedence indicates an order of charge of the first power storage device and charge of the second power storage device.

8. The electric power supply system according to claim 1, wherein the prioritized charge includes:
   an order of charge of the first power storage device and the second power storage device such that the one of the first power storage device and the second power storage device is charged and then the other of the first power storage device and the second power storage device is charged; or
   a weighted charge of the first power storage device and the second power storage device such that:
      the first power storage device and the second power storage device are charged at a same time; and
      the one of the first power storage device and the second power storage device is charged using a greater power charge than the other of the first power storage device and the second power storage device.

9. An electric power supply system, comprising:
   a first power storage having a first capacity and a first output;
   a second power storage having a second capacity smaller than the first capacity and a second output larger than the first output;
   an input through which information including priority information is to be input to prioritize charge of one of the first power storage and the second power storage over charge of the other of the first power storage and the second power storage; and
   a processor configured to
      determine whether the first power storage is charged up to a first target residual capacity and the second power storage is charged up to a second target residual capacity by a timing at which at least one of the first power storage and the second power storage starts discharging, and
      charge either one of or both of the first power storage and the second power storage according to the priority information when it is determined that the first power storage is not charged up to the first target residual capacity and/or the second power storage is not charged up to the second target residual capacity by the timing.

10. The electric power supply system according to claim 9, wherein the processor comprises a power chargeable time calculation section for calculating an electric power chargeable time based on a current time and a scheduled use start time, and a required charge time calculation section for calculating a required charge time necessary to complete power charge of the first power storage and the second power storage, based on a residual capacity of each of the first power storage and the second power storage, wherein, when the power chargeable time is shorter than the required charge time, the processor is configured to allow either one or both of the first power storage and the second power storage to be charged according to the priority information.

11. The electric power supply system according to claim 10, further comprising a temperature sensor for detecting a temperature of the second power storage, and a heating device for heating the second power storage, wherein, when the power chargeable time is shorter than the required charge time and the second power storage has higher precedence than the first power storage, the processor is configured to allow the second power storage to be heated by the heating device when the temperature of the second power storage is lower than a first temperature threshold value at a predetermined timing prior to the scheduled use start time or at a timing of the scheduled use start time.

12. The electric power supply system according to claim 10, further comprising a temperature sensor for detecting a temperature of the second power storage, and a cooling device for cooling the second power storage, wherein, when the power chargeable time is shorter than the required charge time and the second power storage has higher precedence than the first power storage, the processor is configured to allow the second power storage to be cooled by the cooling device when the temperature of the second power storage is higher than a second temperature threshold value at the predetermined timing prior to the scheduled use start time or at the timing of the scheduled use start time.

13. The electric power supply system according to claim 10, further comprising a guide section for outputting a guide display or a guide voice to a user, wherein the processor is configured to allow the guide display or the guide voice which requests the user to input the scheduled use start time at a predetermined timing, to be outputted to the guide section, and the power chargeable time calculation section is configured to calculate the power chargeable time based on the scheduled use start time and the current time which are inputted through the input, wherein, when the power chargeable time is shorter than the required charged time, the processor allows the guide section to output the display or voice for guiding the input of the precedence, to the user, and thereafter, allows the first power storage or the second power storage to be charged on a preferential basis according to the priority information which is inputted into the input, and wherein, when the power chargeable time is longer than the required charge time, the processor allows the first power storage and the second power storage to be charged on the preferential basis of predetermined default without requesting an input of the priority information.

14. The electric power supply system according to claim 9, wherein the first power storage and the second power storage are provided to supply electric power to a motor.

15. The electric power supply system according to claim 9, wherein the priority information indicates an order of charge of the first power storage and charge of the second power storage.

16. The electric power supply system according to claim 9, wherein the prioritized charge includes:
   an order of charge of the first power storage and the second power storage such that the one of the first power storage and the second power storage is charged and then the other of the first power storage and the second power storage is charged; and
   a weighted charge of the first power storage and the second power storage such that:
      the first power storage and the second power storage are charged at a same time; and
      the one of the first power storage and the second power storage is charged using a greater power charge than the other of the first power storage and the second power storage.

17. An electric power supply system, comprising:
a first power storage having a first capacity and a first output;
a second power storage having a second capacity smaller than the first capacity and a second output larger than the first output;
an input through which information including priority information is to be input;
a temperature sensor for detecting a temperature of the second power storage;
a heating device for heating the second power storage; and
a processor configured to
   determine whether the first power storage is charged up to a first target residual capacity and the second power storage is charged up to a second target residual capacity by a timing at which at least one of the first power storage and the second power storage starts discharging, and
   charge either one of or both of the first power storage and the second power storage according to the priority information when it is determined that the first power storage is not charged up to the first target residual capacity and/or the second power storage is not charged up to the second target residual capacity by the timing,
wherein the processor comprises a power chargeable time calculation section for calculating an electric power chargeable time based on a current time and a scheduled use start time, and a required charge time calculation section for calculating a required charge time necessary to complete power charge of the first power storage and the second power storage, based on a residual capacity of each of the first power storage and the second power storage, wherein, when the power chargeable time is shorter than the required charge time, the processor is configured to allow either one or both of the first power storage and the second power storage to be charged according to the priority information, and
when the power chargeable time is shorter than the required charge time and the second power storage has higher precedence than the first power storage, the processor is configured to allow the second power storage to be heated by the heating device when the temperature of the second power storage is lower than a first temperature threshold value at a predetermined timing prior to the scheduled use start time or at a timing of the scheduled use start time.

18. The electric power supply system according to claim 17, wherein the first power storage and the second power storage are provided to supply electric power to a motor.

19. The electric power supply system according to claim 17, wherein the priority information indicates an order of charge of the first power storage and charge of the second power storage.

\* \* \* \* \*